United States Patent
Chen et al.

(10) Patent No.: US 9,525,873 B2
(45) Date of Patent: Dec. 20, 2016

(54) IMAGE PROCESSING CIRCUIT AND IMAGE PROCESSING METHOD FOR GENERATING INTERPOLATED IMAGE

(71) Applicant: NOVATEK MICROELECTRONICS CORP., Hsinchu (TW)

(72) Inventors: Yen-Sung Chen, New Taipei (TW); Tsui-Chin Chen, Hsinchu (TW); Jian-De Jiang, Shaanxi (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 457 days.

(21) Appl. No.: 13/866,486

(22) Filed: Apr. 19, 2013

(65) Prior Publication Data

US 2013/0279590 A1    Oct. 24, 2013

(30) Foreign Application Priority Data

Apr. 20, 2012  (TW) .............................. 101114235 A

(51) Int. Cl.
| | |
|---|---|
| *H04N 11/02* | (2006.01) |
| *H04N 19/51* | (2014.01) |
| *H04N 19/533* | (2014.01) |
| *H04N 19/567* | (2014.01) |
| *H04N 19/587* | (2014.01) |

(52) U.S. Cl.
CPC ...... *H04N 19/00684* (2013.01); *H04N 19/533* (2014.11); *H04N 19/567* (2014.11); *H04N 19/587* (2014.11)

(58) Field of Classification Search
CPC .............................................. H04N 19/00684
USPC ........................................ 375/240.01–240.29
See application file for complete search history.

(56) References Cited

U.S. PATENT DOCUMENTS

| | | | | |
|---|---|---|---|---|
| 4,573,075 | A * | 2/1986 | Bolger ..................... | H04N 5/21 327/72 |
| 5,734,419 | A * | 3/1998 | Botsford et al. ................ | 348/97 |
| 5,751,378 | A * | 5/1998 | Chen et al. .................... | 348/700 |
| 6,583,823 | B1* | 6/2003 | Shimada et al. .............. | 348/616 |
| 6,628,713 | B1* | 9/2003 | Kojima et al. ........... | 375/240.16 |
| 7,738,550 | B2* | 6/2010 | Kuhn ....................... | 375/240.01 |
| 8,018,998 | B2* | 9/2011 | Li et al. .................... | 375/240.16 |
| 8,135,068 | B1* | 3/2012 | Alvarez et al. .......... | 375/240.16 |
| 8,467,452 | B2* | 6/2013 | Bellers ..................... | 375/240.16 |
| 2005/0243927 | A1* | 11/2005 | Hubrich et al. ......... | 375/240.16 |
| 2007/0133420 | A1* | 6/2007 | Guven et al. ................. | 370/238 |
| 2007/0133686 | A1* | 6/2007 | Lee et al. ................. | 375/240.16 |
| 2009/0190037 | A1* | 7/2009 | Chang et al. ................. | 348/699 |
| 2009/0285301 | A1* | 11/2009 | Kurata ..................... | 375/240.16 |
| 2010/0128792 | A1* | 5/2010 | Saito et al. ............. | 375/240.16 |
| 2010/0201888 | A1* | 8/2010 | Peng et al. ..................... | 348/699 |

(Continued)

*Primary Examiner* — Leron Beck
(74) *Attorney, Agent, or Firm* — Rabin & Berdo, P.C.

(57) ABSTRACT

An image processing circuit and an image processing method are provided. The image processing circuit comprises a full search engine and a frame rate conversion (FRC) engine. The full search engine executes a full search to generate a sum of sum of absolute difference (SAD) distribution according to the reference image and the current image. The FRC engine analyzes a scene characteristic from the current image according to SAD distribution. The FRC engine adjusts at least one of the control parameters according to the scene characteristic. The FRC engine generates an interpolated image according to the reference image, the current image and the control parameters.

20 Claims, 3 Drawing Sheets

(56) References Cited

U.S. PATENT DOCUMENTS

2011/0135001 A1\* 6/2011 Yang et al. .............. 375/240.16
2011/0268190 A1\* 11/2011 Morphet et al. ......... 375/240.16
2011/0292997 A1\* 12/2011 An et al. .................. 375/240.03
2013/0121419 A1\* 5/2013 Le Dinh et al. ......... 375/240.16

\* cited by examiner

IMAGE PROCESSING CIRCUIT AND IMAGE PROCESSING METHOD FOR GENERATING INTERPOLATED IMAGE

This application claims the benefit of Taiwan application Ser. No. 101114235, filed Apr. 20, 2012, the subject matter of which is incorporated herein by reference.

BACKGROUND OF THE INVENTION

Field of the Invention

The invention relates in general to an image processing circuit and an image processing method, and more particularly to an image processing circuit using frame rate conversion (FRC) and an image processing method using the same.

Description of the Related Art

According to frame rate conversion (FRC), a compensation image is obtained by way of interpolation through motion estimate and motion compensation (MEMC). To obtain a correct compensation image, a correct the motion vector is firstly estimated, and then a correct compensation image is obtained according to the motion vector.

However, when calculating the motion vector, conventional frame rate conversion normally cannot obtain the overall state of the current image. Therefore, for fast-moving images or images with dramatic changes, correct compensation images cannot be obtained through correct prediction.

SUMMARY OF THE INVENTION

The invention is directed to an image processing circuit and an image processing method.

According to one embodiment of the present invention, an image processing circuit is provided. The image processing circuit comprises a full search engine and a frame rate conversion (FRC) engine. The full search engine executes a full search to generate a sum of absolute differences (SAD) distribution according to the reference image and the current image, wherein the SAD distribution comprises a plurality of sums of absolute differences. The FRC engine generates an interpolated image according to the reference image, the current image and the control parameters. When part of the sums of absolute differences is not larger than a smallest threshold, the FRC engine determines whether the number of the sums of absolute differences which are larger than the smallest threshold is larger than the smallest threshold is equal to 1 or less than 1. When the number of the sums of absolute differences is equal to 1 or less than 1, the current image comprises a good scene. When the number of the sums of absolute differences which are larger than the smallest threshold is larger than 1, the current image comprises a periodic scene. When all of the sums of absolute differences are larger than the smallest threshold, the FRC engine determines whether all of the sums of absolute differences are larger than an average pixel level (APL). When all of the sums of absolute differences are larger than the APL, the current image comprises the flash scene. When part of the sums of absolute differences is not larger than the APL, the current image comprises the bad scene. The FRC engine adjusts at least one of the control parameters according to the good scene, the periodic scene, the flash scene or the bad scene.

According to another embodiment of the present invention, an image processing circuit is provided. The image processing circuit comprises a full search engine and a frame rate conversion (FRC) engine. The full search engine executes a full search to generate a sum of absolute difference (SAD) distribution according to a reference image and a current image. The SAD distribution comprises a plurality of sums of absolute differences. The FRC engine generates an interpolated image according to the reference image, the current image and a plurality of control parameters comprising a SAD coring threshold and a quantity of candidate motion vectors, and adjusts the SAD coring threshold or the quantity of candidate motion vectors according to the SAD distribution.

According to an alternate embodiment of the present invention, an image processing method is provided. The image processing method comprises: executing a full search to generate a sum of absolute differences (SAD) distribution according to a reference image and a current image, wherein the SAD distribution comprises a plurality of sums of absolute differences; analyzing a scene characteristic from the current image according to the SAD distribution; adjusting at least one of a plurality of control parameters comprising a SAD coring threshold and a quantity of candidate motion vectors according to the scene characteristic; adjusting the SAD coring threshold or the quantity of candidate motion vectors according to the SAD distribution; generating an interpolated image according to the reference image, the current image and the control parameters.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
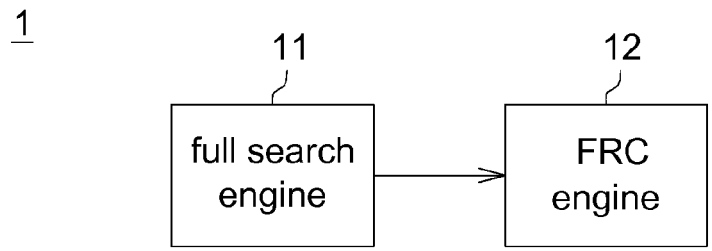
FIG. 1 shows a schematic diagram of an image processing circuit according to an embodiment.
Figure 2:
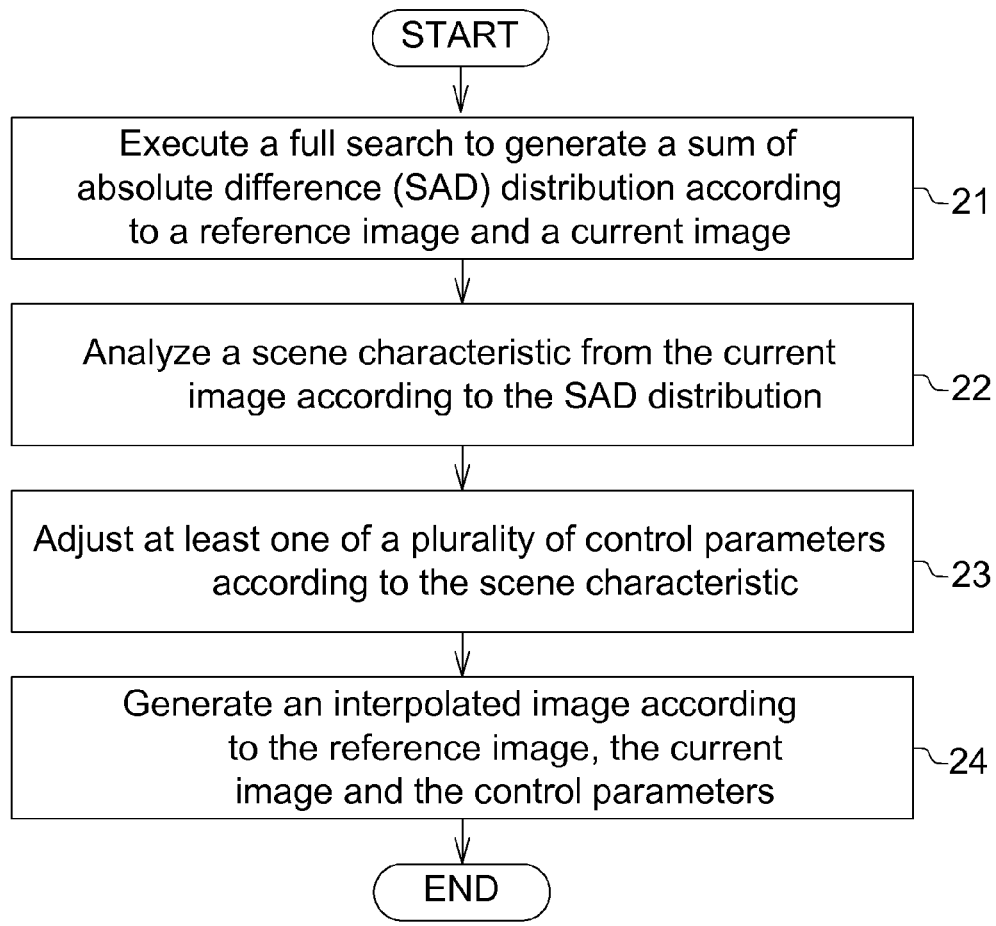
FIG. 2 shows an image processing method according to an embodiment.
Figure 3:
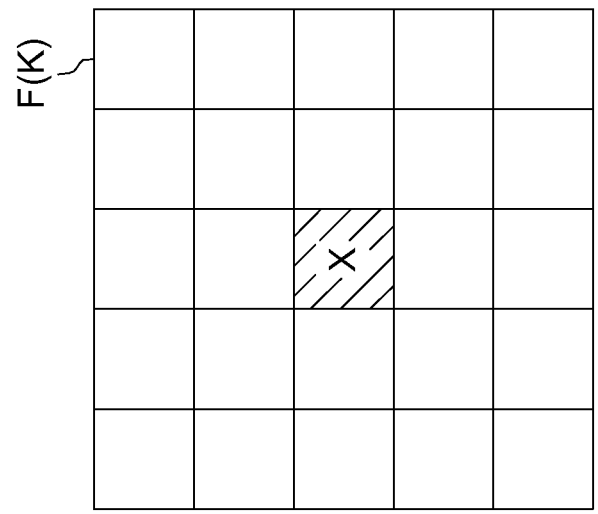
FIG. 3 shows a schematic diagram of a full search.
Figure 3:
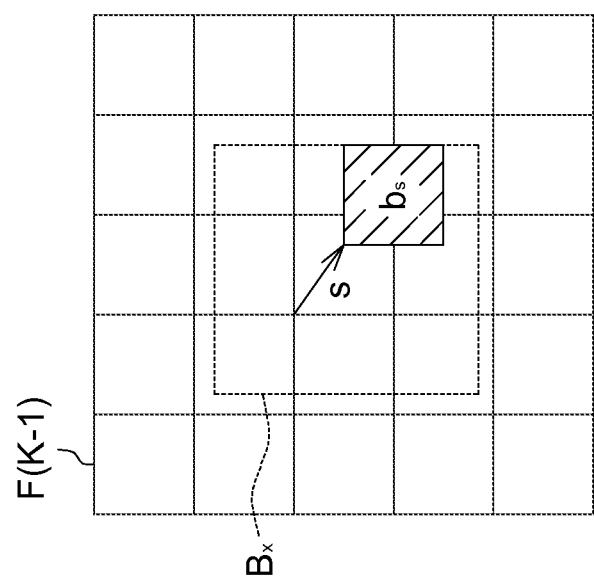

Referring to FIG. 1, FIG. 2 and FIG. 3 at the same time. FIG. 1 shows a schematic diagram of an image processing circuit according to an embodiment. FIG. 2 shows an image processing method according to an embodiment. FIG. 3 shows a schematic diagram of a full search. The image processing circuit 1 comprises a full search engine 11 and a frame rate conversion (FRC) engine 12. Frame rate conversion is also referred as motion estimate and motion compensation (MEMC). The image processing method can be applied in an image processing circuit 1, and at least comprises steps 21 to 24.

Firstly, the method begins at step 21, the full search engine 11 executes a full search to generate a sum of absolute differences (SAD) distribution according to a reference image $F(k-1)$ and a current image $F(k)$, wherein the SAD distribution comprises a plurality of sums of absolute differences. In the full search, the reference image $F(k-1)$ and the current image $F(k)$ are divided into a plurality of identical blocks. Suppose the block X illustrated in FIG. 3 is a to-be-compared block, and the search region Bx is a search region of the reference image $F(k-1)$ to be compared with the block X. The set S denotes a set consisting of all possible motion vectors, and any motion vector s belongs to the set S, that is, $s \in S$. The full search engine 11 searches all blocks within the search region Bx to locate a block most similar to the block X. The full search engine 11 locates the block most similar to the block X through the sums of absolute differences (SAD) expressed as:

$$SAD(dx, dy) = \sum_{m=x}^{x+N-1} \sum_{n=y}^{y+N-1} |I_k(m, n) - I_{k-1}(m + dx, n + dy)|.$$

Wherein, $I_k(m,n)$ denotes the values of the pixel at the $m^{th}$ row and the $n^{th}$ column in the block X of the current image F(k); $I_{k-1}(m+dx,n+dy)$ denotes the values of the pixel at the $(m+dx)^{th}$ row and the $(n+dy)^{th}$ column in the search region Bx.

Next, the method proceeds to step 22, the FRC engine 12 analyzes a scene characteristic from the current image F(k) according to the SAD distribution. Then, the method proceeds to step 23, the FRC engine 12 adjusts at least one of a plurality of control parameters according to the scene characteristic. Then, the method proceeds to step 24, the FRC engine 12 generates an interpolated image according to the reference image F(k-1), the current image F(K) and the control parameters.

Figure 4:
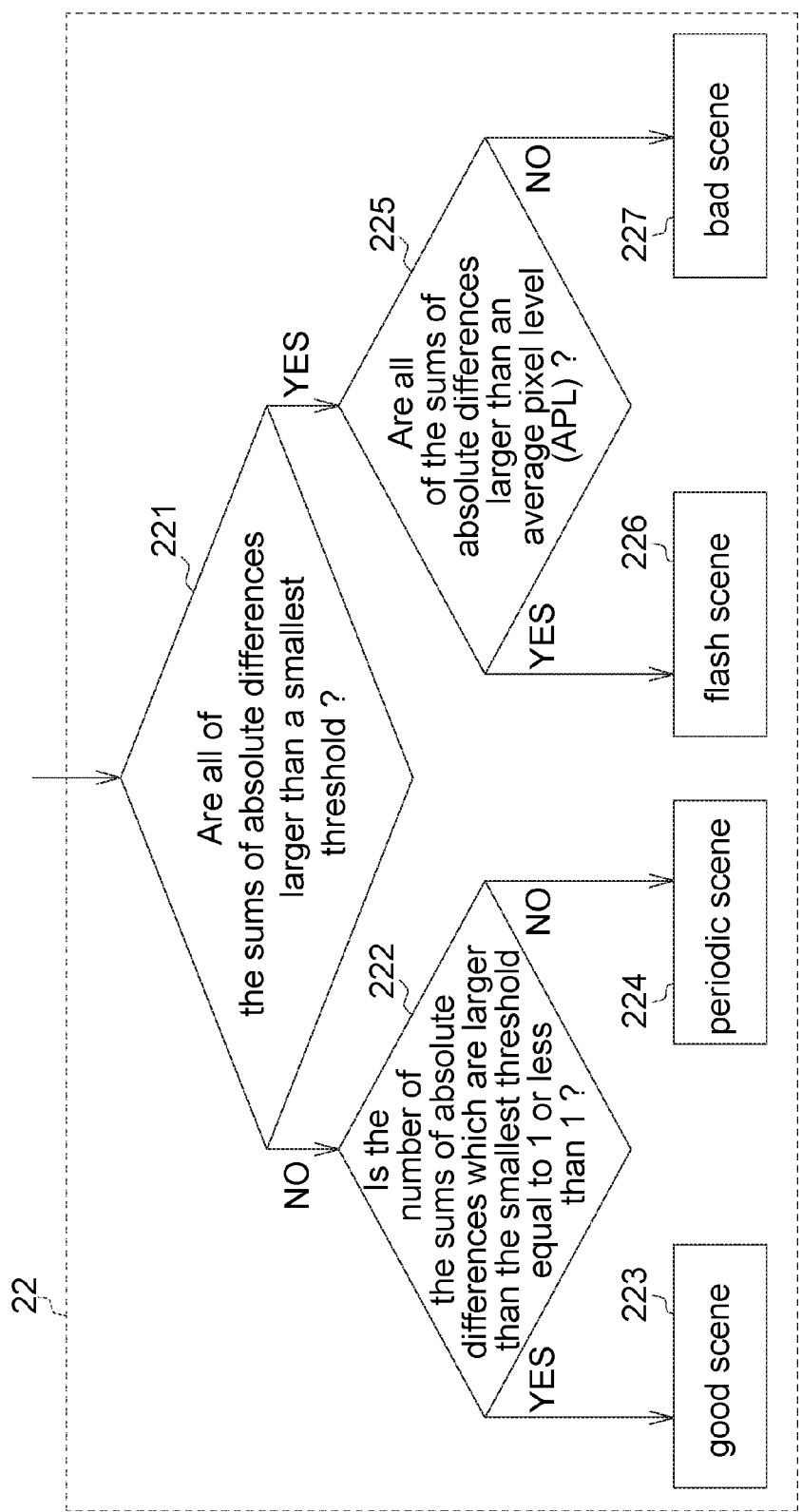
FIG. 4 shows a detailed flowchart of step 22.

Referring to FIG. 1, FIG. 3 and FIG. 4 at the same time. FIG. 4 shows a detailed flowchart of step 22. The step 22 further comprises steps 221 to 227. As indicated in step 221, the FRC engine 12 determines whether all of the sums of absolute differences are larger than a smallest threshold. When part of the sums of absolute differences is not larger than the smallest threshold, this indicates that a block similar to the block X is found in the search region Bx, and step 222 is executed accordingly. As indicated in step 222, the FRC engine 12 further determines whether the number of the sums of absolute differences which are larger than the smallest threshold is equal to 1 or less than 1.

When the number of the sums of absolute differences which are larger than the smallest threshold is equal to 1 or less than 1, the method proceeds to step 223, the FRC engine 12 analyzes that the current image F(k) comprises a good scene. Conversely, when the number of the sums of absolute differences which are larger than the smallest threshold is larger than 1, the method proceeds to step 224, the FRC engine 12 analyzes that the current image F(k) comprises a periodic scene.

When all of the sums of absolute differences are larger than the smallest threshold, the method proceeds to step 225, the FRC engine 12 further determines whether all of the sums of absolute differences are larger than an average pixel level (APL). When all of the sums of absolute differences are larger than the APL, the method proceeds to step 226, the FRC engine 12 analyzes that the current image F(k) comprises a flash scene. Conversely, when part of the sums of absolute differences is not larger than the APL, the method proceeds to step 227, the FRC engine 12 analyzes that the current image F(k) comprises a bad scene.

The said control parameters such as comprise an update vector used in a three-dimensional recursive search (3DRS), a SAD coring threshold or a quantity of candidate motion vectors. The reference vector for the $i^{th}$ calculation of a block is expressed as:

$$c_i = \begin{cases} d(x + p_i, k) \\ d(x + p, k - 1) \\ c_j + u, j \neq i, u \in US \end{cases},$$

wherein $c_i = d(x+p_i,k)$ denotes a space reference; $p_i$ denotes a relative position; k denotes an $k^{th}$ image; $c_i = d(x+p_i,k-1)$ denotes a time reference; k−1 denotes a $(k-1)^{th}$ image. The vector in a search region is expressed as: $c_i = c_j + u$, j i,u∈US. The update vector u is selected from an update set US. Therefore, when the update vector u increases, this indicates that update rate will increase. Conversely, when the update vector u decreases, this indicates that update rate will decrease.

When the current image comprises the good scene, the FRC engine 12 keeps the update vector u unchanged. When the current image comprises the periodic scene or the flash scene, the FRC engine 12 decreases the update vector u to decrease update rate. Conversely, when the current image comprises the bad scene, the FRC engine 12 increases the update vector u to speed up update rate.

Likewise, the said FRC engine 12 may adjust the quantity of candidate motion vectors according to the scene characteristic. For example, when the current image comprises the good scene, the FRC engine 12 keeps the quantity of candidate motion vectors unchanged. When the current image comprises the periodic scene, the flash scene or the bad scene, the FRC engine 12 decreases the quantity of candidate motion vectors.

In addition, to make the motion vector more smoothed, the sum of absolute differences is deducted by a SAD coring threshold, so as to increase the likelihood of finding the same motion vector. The said FRC engine 12 may adjust the SAD coring threshold according to the scene characteristic. For example, when the current image comprises the good scene, the FRC engine 12 keeps the SAD coring threshold unchanged. When the current image comprises the flash scene, the FRC engine 12 decreases the SAD coring threshold. Conversely, when the current image comprises the periodic scene, or the bad scene, the FRC engine 12 increases the SAD coring threshold.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing circuit, comprising:
  a full search engine, which executes a full search to generate a sum of absolute differences (SAD) distribution according to a reference image and a current image, wherein the SAD distribution comprises a plurality of sums of absolute differences; and
  a frame rate conversion (FRC) engine, which generates an interpolated image according to the reference image, the current image and a plurality of control parameters, wherein the FRC engine determines whether the number of the sums of absolute differences which are larger than a smallest threshold is equal to 1 or less than 1 when part of the sums of absolute differences is not larger than the smallest threshold, the current image comprises a good scene when the number of the sums of absolute differences which are larger than the smallest threshold is equal to 1 or less than 1, the current image comprises a periodic scene when the number of the sums of absolute differences which are larger than the smallest threshold is larger than 1, the FRC engine determines whether all of the sums of absolute differences are larger than an average pixel level (APL) when all of the sums of absolute differences are larger than the smallest threshold, the current image comprises a flash scene when all of the sums of absolute differences are larger than the APL, the current image comprises a bad scene when part of the sums of absolute differences is not larger than the APL, and the FRC engine adjusts at least one of the control parameters according to the good scene, the periodic scene, the flash scene or the bad scene.

2. The image processing circuit according to claim 1, wherein the control parameters comprise an update vector used in a three-dimensional recursive search (3DRS).

3. The image processing circuit according to claim 2, wherein the frame rate conversion engine increases the update vector when the current image comprises the bad scene and decreases the update vector when the current image comprises the flash scene or the periodic scene.

4. The image processing circuit according to claim 1, wherein the control parameters comprise a quantity of candidate motion vectors.

5. The image processing circuit according to claim 4, wherein the frame rate conversion engine decreases the quantity of candidate motion vectors when the current image comprises the bad scene, the flash scene or the periodic scene.

6. An image processing circuit, comprising:
a full search engine, which executes a full search to generate a sum of absolute difference (SAD) distribution according to a reference image and a current image, wherein the SAD distribution comprises a plurality of sums of absolute differences; and
a frame rate conversion (FRC) engine, which generates an interpolated image according to the reference image, the current image and a plurality of control parameters, and adjusts the plurality of control parameters according to the SAD distribution;
wherein the FRC engine, in adjusting the plurality of control parameters according to the SAD distribution;
determines whether the number of the sums of absolute differences that is larger than a smallest threshold is equal to 1 or less than 1 when part of the sums of absolute differences is not larger than the smallest threshold, and
when the number of the sums of absolute differences that is determined to be larger than the smallest threshold is equal to 1 or less than 1, determines that the current image comprises a good scene the FRC engine and keeps the control parameters unchanged.

7. The image processing circuit according to claim 6, wherein the FRC engine, in adjusting the plurality of control parameters according to the SAD distribution when the number of the sums of absolute differences which are larger than the smallest threshold is larger than 1, determines that the current image comprises a periodic scene and decreases an update vector used in a three-dimensional recursive search (3DRS), that is included in the control parameters.

8. The image processing circuit according to claim 6, wherein the FRC engine, in adjusting the plurality of control parameters according to the SAD distribution, further comprises when the number of the sums of absolute differences which are larger than the smallest threshold is larger than 1, determines that the current image comprises a periodic scene and decreases a quantity of candidate motion vectors that is included in the control parameters.

9. The image processing circuit according to claim 6, wherein the FRC engine, in adjusting the plurality of control parameters according to the SAD distribution:
determines whether all of the sums of absolute differences are larger than an average pixel level (APL) when all of the sums of absolute differences are determined to be larger than the smallest threshold, and
when all of the sums of absolute differences are determined to be larger than the APL, determines that the current image comprises a flash scene, and decreases an update vector, used in a three-dimensional recursive search (3DRS), that is included in the control parameters.

10. The image processing circuit according to claim 6, wherein the FRC engine, in adjusting the plurality of control parameters according to the SAD distribution:
determines whether all of the sums of absolute differences are larger than an average pixel level (APL) when all of the sums of absolute differences are larger than the smallest threshold, and
when all of the sums of absolute differences are determined to be larger than the APL, determines that the current image comprises a flash scene, and decreases a quantity of candidate motion vectors that is included in the control parameters.

11. The image processing circuit according to claim 6, wherein, in adjusting the plurality of control parameters according to the SAD distribution:
determines whether all of the sums of absolute differences are larger than an average pixel level (APL) when all of the sums of absolute differences are larger than the smallest threshold, and
when part of the sums of absolute differences is determined to be not larger than the APL, determines the current image comprises a bad scene, and increases an update vector, used in a three-dimensional recursive search (3DRS), that is included in the control parameters.

12. The image processing circuit according to claim 6, wherein the FRC engine, in adjusting the plurality of control parameters according to the SAD distribution:
when all of the sums of absolute differences are determined to be larger than the smallest threshold, determines whether all of the sums of absolute differences are larger than an average pixel level (APL), and
when part of the sums of absolute differences is determined to be not larger than the APL, determines that the current images comprises a bad scene, and decreases a quantity of candidate motion vectors that is included in the control parameters.

13. An image processing method, comprising:
executing a full search to generate a sum of absolute differences (SAD) distribution according to a reference image and a current image, wherein the SAD distribution comprises a plurality of sums of absolute differences;
analyzing a scene characteristic from the current image according to the SAD distribution; and
generating an interpolated image according to the reference image, the current image and the control parameters;
wherein the step of analyzing the scene characteristic includes:
determining whether part of the sums of absolute differences is not larger than a smallest threshold;
determining whether the number of the sums of absolute differences which are larger than the smallest threshold is equal to 1 or less than 1 when part of the sums of absolute differences is not larger than the smallest threshold; and determining that the current image comprises a good scene when the number of the sums of absolute differences which are larger than the smallest threshold is equal to 1 or less than 1.

14. The image processing method according to claim 13, wherein the analyzing step further comprises:
    determining that the current image comprises a periodic scene when the number of the sums of absolute differences which are larger than the smallest threshold is larger than 1;
    determining whether all of the sums of absolute differences are larger than an average pixel level (APL) when all of the sums of absolute differences are larger than the smallest threshold;
    determining that the current image comprises a flash scene when the all of the sums of absolute differences are larger than the APL; and
    determining that the current image comprises a bad scene when part of the sums of absolute differences is not larger than the APL.

15. The image processing method according to claim 13, wherein the control parameters comprise an update vector used in a three-dimensional recursive search (3DRS), and the update vector is decreased when the current image comprises a periodic scene.

16. The image processing method according to claim 13, wherein the control parameters comprise a quantity of candidate motion vectors, and the quantity of candidate motion vectors is decreased when the current image comprises a periodic scene.

17. The image processing method according to claim 13, wherein the control parameters comprise an update vector used in a three-dimensional recursive search (3DRS), and the update vector is decreased when the current image comprises a flash scene.

18. The image processing method according to claim 13, wherein the control parameters comprise a quantity of candidate motion vectors, and the quantity of candidate motion vectors is decreased when the current image comprises a flash scene.

19. The image processing method according to claim 13, wherein the control parameters comprise an update vector used in a three-dimensional recursive search (3DRS), and the update vector is increased when the current image comprises a bad scene.

20. The image processing method according to claim 13, wherein the control parameters comprise a quantity of candidate motion vectors, and the quantity of candidate motion vectors is decreased when the current image comprises a bad scene.

* * * * *